US006684878B2

(12) United States Patent
Ho et al.

(10) Patent No.: US 6,684,878 B2
(45) Date of Patent: Feb. 3, 2004

(54) CONDENSATE DRAINAGE SYSTEM FOR AN OUTDOOR CONDENSING FURNACE

(75) Inventors: Chi Ming Ho, Simpsonville, SC (US); Alan Dale Abbott, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 194 days.

(21) Appl. No.: 09/974,526

(22) Filed: Oct. 11, 2001

(65) Prior Publication Data

US 2003/0070672 A1 Apr. 17, 2003

(51) Int. Cl.[7] ............... F24H 3/00; F24H 3/10; F24H 3/02; F28B 9/08
(52) U.S. Cl. ............... 126/110 R; 126/116 R; 126/113; 126/99 R
(58) Field of Search ............... 126/110 R, 116 R, 126/99 R, 113

(56) References Cited

U.S. PATENT DOCUMENTS

| 2,268,789 | A | * | 1/1942 | Watt | 237/16 |
|---|---|---|---|---|---|
| 2,408,084 | A | * | 9/1946 | Martin | 126/350.2 |
| 2,504,315 | A | * | 4/1950 | Feuerfile | 126/110 R |
| RE24,295 | E | * | 3/1957 | Johnson | 126/376.1 |
| 2,955,439 | A | * | 10/1960 | Pinter | 62/278 |
| 3,267,985 | A | * | 8/1966 | Kitchen | 431/1 |
| 4,261,326 | A | * | 4/1981 | Ihlenfield | 126/110 R |
| 4,449,511 | A | * | 5/1984 | Hays et al. | 126/110 R |
| 4,478,158 | A | * | 10/1984 | Smith | 110/215 |
| 4,478,206 | A | * | 10/1984 | Ahn | 126/99 A |
| 4,515,145 | A | * | 5/1985 | Tallman et al. | 126/99 A |
| 4,549,526 | A | * | 10/1985 | Lunde | 126/367.1 |
| 4,601,654 | A | * | 7/1986 | Kitchen | 431/1 |
| 4,621,686 | A | * | 11/1986 | Ahn | 165/113 |
| 4,706,884 | A | * | 11/1987 | Brauer | 237/55 |
| 4,718,401 | A | * | 1/1988 | DeLancey | 126/110 R |
| 4,779,676 | A | * | 10/1988 | Harrigill | 165/170 |
| 4,989,781 | A | * | 2/1991 | Guyer et al. | 237/56 |
| 4,992,376 | A | * | 2/1991 | Konishi et al. | 435/253.5 |
| 5,097,819 | A | * | 3/1992 | Talbert et al. | 126/110 R |
| 5,178,124 | A | * | 1/1993 | Lu et al. | 126/110 R |
| 5,361,795 | A | * | 11/1994 | Pollard | 137/1 |
| 5,439,050 | A | * | 8/1995 | Waterman et al. | 165/170 |
| 5,704,343 | A | * | 1/1998 | Ahn et al. | 126/110 R |
| 5,775,318 | A | * | 7/1998 | Haydock et al. | 126/110 R |
| 2002/0108607 | A1 | * | 8/2002 | Videto et al. | 126/110 R |

* cited by examiner

Primary Examiner—Carl D. Price

(57) ABSTRACT

An outdoor condensing furnace is provided with a condensate drain line which passes through the heat exchange compartment and to a location within the building where it can be discharged at temperatures above freezing. During heating operation, the drain line is maintained at temperatures above freezing such that the condensate will not freeze, and if condensate is trapped in the drain line and freezes during periods of nonheating operation, then it will be quickly thawed when heating operation is resumed. In an alternate embodiment, a drain pan is placed in direct contact with the primary heat exchanger and the condensate is routed to drain pan to be vaporized. Another embodiment provides for routing of the condensate from the condensing heat exchanger, through a flue pipe, and to a drain site which is at above freezing ambient conditions.

15 Claims, 3 Drawing Sheets

CONDENSATE DRAINAGE SYSTEM FOR AN OUTDOOR CONDENSING FURNACE

BACKGROUND OF THE INVENTION

This invention relates generally to gas furnaces and, more particularly, to a method and apparatus for draining condensate from a condensing furnace that may operate at temperatures below freezing.

In order to improve the operating efficiency of residential gas furnaces, it has become common practice to add a condensing heat exchange downstream of the primary heat exchange so as to recover the latent heat of condensation that is otherwise lost to the flue gases that are discharged to the atmosphere. Such a system is shown and described in U.S. Pat. No. 5,439,050 assigned to the assignee of the present invention. Such furnaces are normally located in basements, attics, closets or crawl spaces where the temperatures are relatively warm and from which the resulting condensate can be easily drained without any danger of freezing.

As rooftop air conditioners have evolved to include heat pumps and supplemental heat in the form of electrical resistance heaters, gas furnaces have now come to be incorporated as part of the system. Heretofore, the performance efficiency of the air conditioner has been paramount, with little consideration being given to the heating efficiency of the system. However, as year-around operating efficiencies are becoming more important with increased emphasis on lifetime operating costs, consideration is being given to the possibility of adding a condensing heat exchanger to such outdoor furnace systems.

Unlike a residential condensing furnace, when a condensing rooftop unit operates under subfreezing ambient conditions, disposal of the condensate is a problem. This is also true of other systems located where they are exposed to ambient conditions, such as ground based systems. That is, during heating operation, the condensate may commence to freeze at the discharge end of the drain line and slowly work its way up toward the condensing heat exchanger. Further, once the condensing furnace is turned off, any residual condensate that may be trapped somewhere along the condensing heat exchanger or the drain line, can freeze. The frozen condensate may cause restriction or blockage, and may even backfill the unit with condensate the next time the furnace comes on.

It is therefore an object of the present invention to provide an improved condensate drainage system for an outdoor condensing furnace.

This object and other features and advantages become more readily apparent upon reference to the following description when taken in conjunction with the appended drawings

SUMMARY OF THE INVENTION

In accordance with one aspect of the invention, a condensate drain line is provided to conduct the flow of condensate from the condensing heat exchanger to a location where the temperature is above freezing to thereby ensure that, during heating operation, the condensate can be properly discharged without freezing.

In accordance with another aspect of the invention, the drain line passes through a space in which the temperature during heating operation is designed to be maintained above freezing such that the condensate is not exposed to freezing temperatures during heating operation.

By another aspect of the invention, the drain line passes through a space in which the temperature during heating operation is designed to be maintained substantially above freezing, such that any condensate that may freeze in the drain line during a furnace-off operation, will be caused to thaw when furnace operation is resumed.

In accordance with another aspect of the invention, the drain line is routed through the compartment containing the primary heat exchanger.

By yet another aspect of invention, the drain line passes into the primary heat exchanger compartment and discharges into a drain pan which is in direct contact with the primary heat exchanger such that during your furnace operation, condensate is caused to vaporize from the drain pan.

By still another aspect of the invention, the drain line passes through the flue of the furnace and terminates just short of the termination of the flue.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
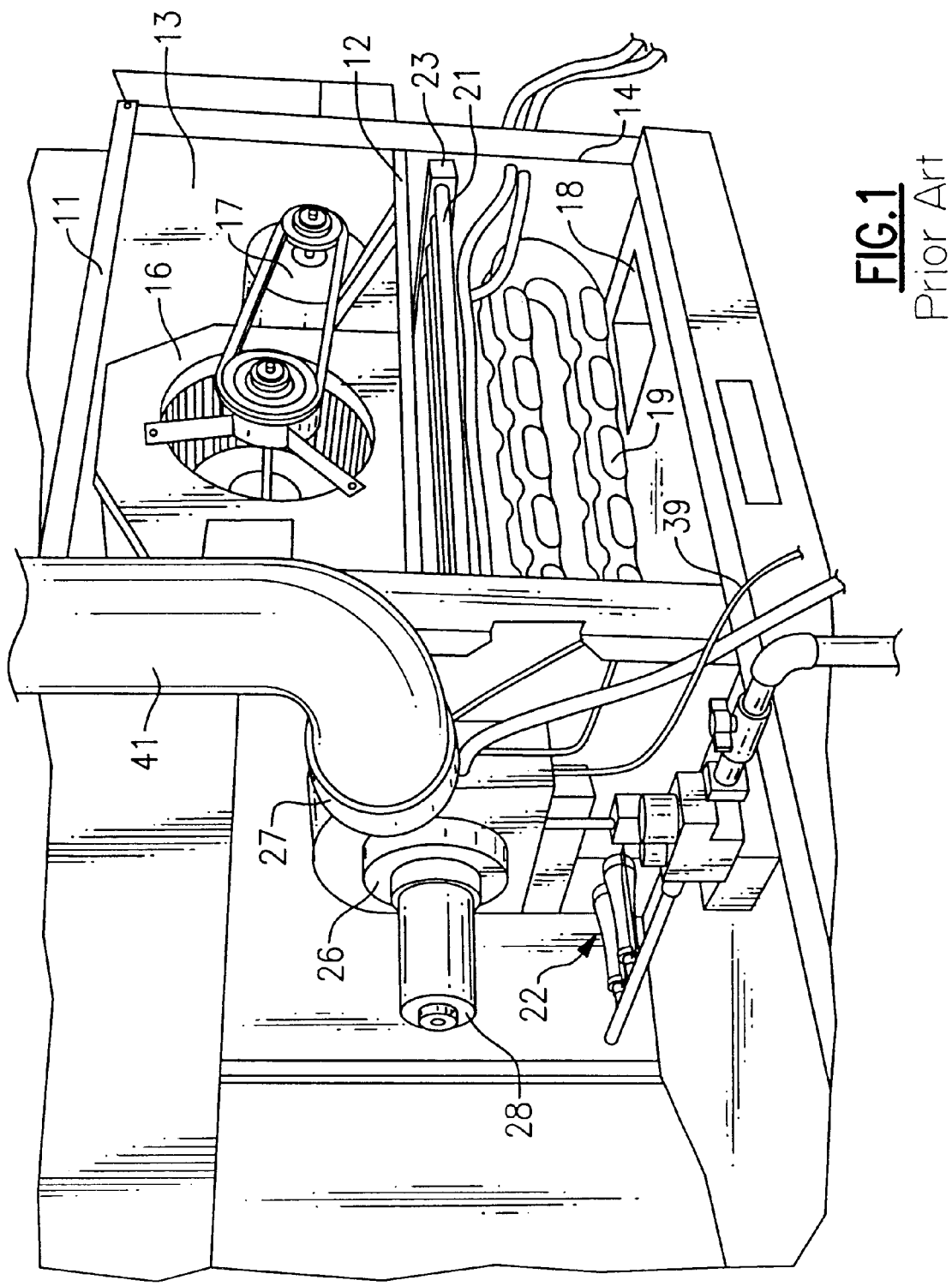
FIG. 1 is a perspective view of a typical rooftop furnace to which the present invention can be applied.

Referring to FIG. 1, there is shown a typical gas furnace of the type that is mounted on a rooftop for heating air to be circulated within the building below. The furnace includes a housing 11 with a fan deck 12 extending horizontally across its midsection to define an upper, fan compartment 13 and lower, heat exchange compartment 14. A fan blower 16 and its drive motor 17 are mounted on the fan deck 12 and operate to circulate the air to be heated from a return duct (not shown), through the heat exchange compartment 14 and to a supply air duct 18.

In the heat exchange compartment 14 below, there is provided a plurality of side-by-side, primary heat exchanger sections 19 and a plurality of secondary or condensing heat exchanger sections 21. For simplicity, the remaining description will be in terms of single sections of both primary and condensing heat exchangers. The primary heat exchanger 19 may be of any type or form but is shown as a four-pass tubular heat exchanger with only the third and fourth pass being seen, and with a gas burner 22 installed in the inlet end thereof for heating the air therein. At the outlet and of the primary heat exchanger 19 there is provided a collector box (not shown) for transitioning between the outlet of the primary heat exchanger 19 and the inlet of the condensing heat exchanger 21.

The condensing heat exchanger may also take on various forms but is shown as a two-pass, tubular heat exchanger with a transition box 23 interconnecting the first and second passes. At the outlet end of the condensing heat exchanger there is a flue box 24 (not visible) which fluidly communicates with an inducer 26, which in turn is fluidly connected to a flue vent 27. An inducer motor 28 drives the inducer 27 which draws the heated air first through the primary heat exchanger 19, then through the condenser heat exchanger 21, and finally out the flue vent 27 in a conventional manner. The condensate which forms in the condensing heat exchanger 21 flows to the flue box 24 and is then disposed of in a manner to be more fully described hereinafter.

Figure 2:
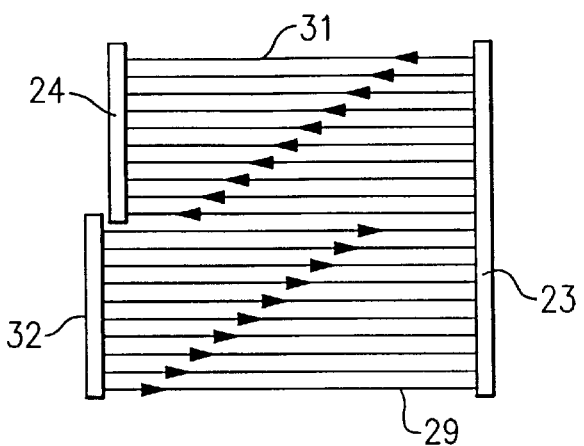
FIG. 2 is a top view of the condensing heat exchanger portion thereof.
Figure 3:
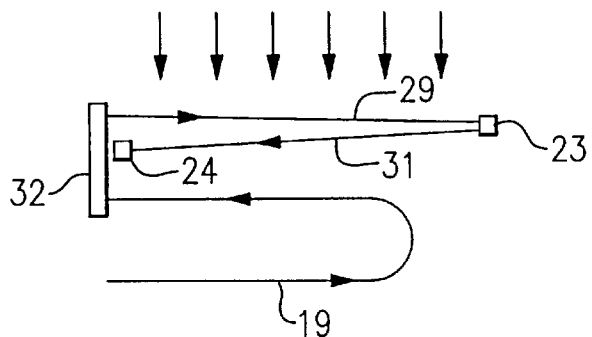
FIG. 3 is a front view thereof.

FIGS. 2 and 3 show the condensing heat exchanger 21 in schematic form to include first and second passes 29 and 31 interconnected by the transition box 23. As will be seen in FIG. 2, each pass consists of a plurality of tubes. Each of the passes 29 and 31 is angled slightly to facilitate the drainage of condensate in the flow direction of the flue gas so as to arrive at the flue box 24. The flue gas is thus caused by the inducer 26 to flow serially, as indicated by the arrows, through the primary heat exchanger 19, the collector box 32, the first and second passes, 29 and 31, of the condensing heat exchanger, through the flue box 24 and finally out of the flue vent 27. The air being circulated by the blower 16 for being heated, flows over the heat exchangers as indicated by the downward arrows as shown.

Figure 4:
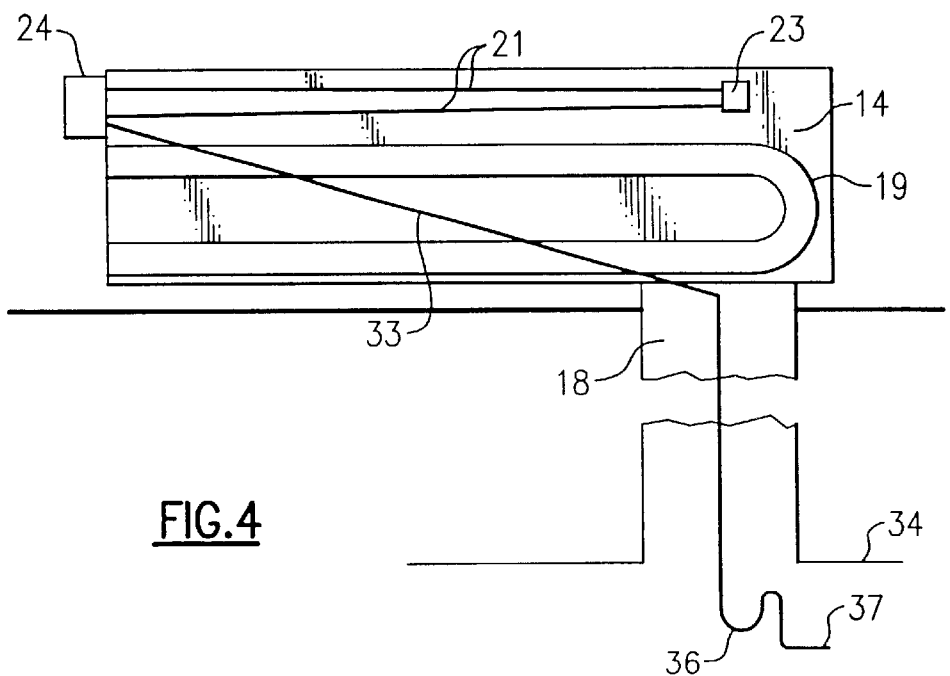
FIG. 4 is a schematic illustration of one embodiment of the invention.

Considering now the problem of condensate disposal when operating at subfreezing ambient conditions, reference is made to FIG. 4 as one possible embodiment of the invention. A drain line 33 is attached at its one end to the flue box 24, and then extends downwardly through the heat exchange compartment 14, and into the supply air duct 18, through which it passes to get to the inside of the building 34 where the temperatures are always maintained at a level above freezing. There, a trap 36 is provided, and condensate can be safely discharged from its end 37 downstream thereof. Thus, during heating operation, wherein condensation is being generated, the drain line 33 and the condensation flowing therein, is within a space (i.e. the heat exchanger compartment 14 and the supply air duct 18) in which the temperature is maintained at a level above freezing to thereby prevent the condensate from freezing in the drain line 33.

Alternatively, the trap 36 can be located within the heat exchange compartment 14, with the condensate then being discharged directly outdoors.

Another possibility that must be considered is that of some condensate being trapped or otherwise retained in the drain line 33 when the furnace is turned off. In such case, as the temperatures in the heat exchanger compartment 14 cool down to eventually reach freezing temperatures, the trapped condensate will freeze. It is therefore important that upon resumption of the furnace operation, that frozen condensate is quickly caused to thaw so as to permit continued flow of condensate through the drain line 33. Again, the heat that is generated within the heat exchanger compartment 14 accomplishes this function. In this regard, heat is transferred to the drain line 33 in three ways. It is transferred by radiation from the hot surface of the tubes of the primary heat exchanger. It is transferred through convection from the warm airstream flowing through the heat exchange compartment 14 and to the supply air duct 18. Finally, heat can be transferred to the drain line to 18 through conduction if it is in contact with the heat exchanger tube.

Figure 5:
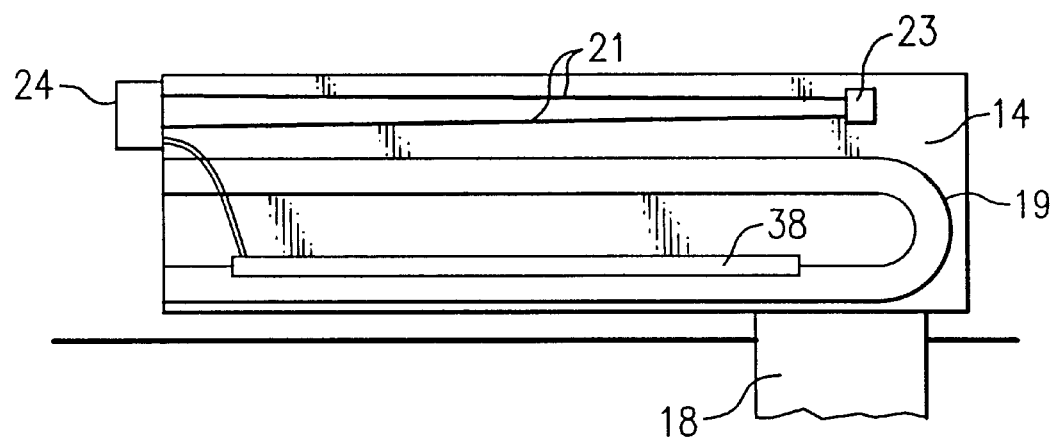
FIG. 5 is a schematic illustration of another embodiment of the invention.

Referring now to FIG. 5, an alternative embodiment of the invention is shown. Here, the drain line 33 is relatively short, and it leads from the flue box 24 to a drain pan 38, which is not only located within the heat exchanger compartment 14 but is made to rest on, and have substantial engaging contact with, the surface of the primary heat exchanger 19. Preferably, the drain pan 38 is placed in contact with the first pass of the primary heat exchanger tube such that the maximum amount of heat can be transferred thereto. As the heat from the primary heat exchanger 19 is transferred to the condensate in the drain pan 38, the condensate is caused to vaporize inside the heat exchanger compartment 14, such that the generated steam is released as moisture to the supply airstream going to the supply air duct 18. As a result, the condensate and the heat stored in its are recovered in the airstream and circulated back to the space that is being heated.

Figure 6:
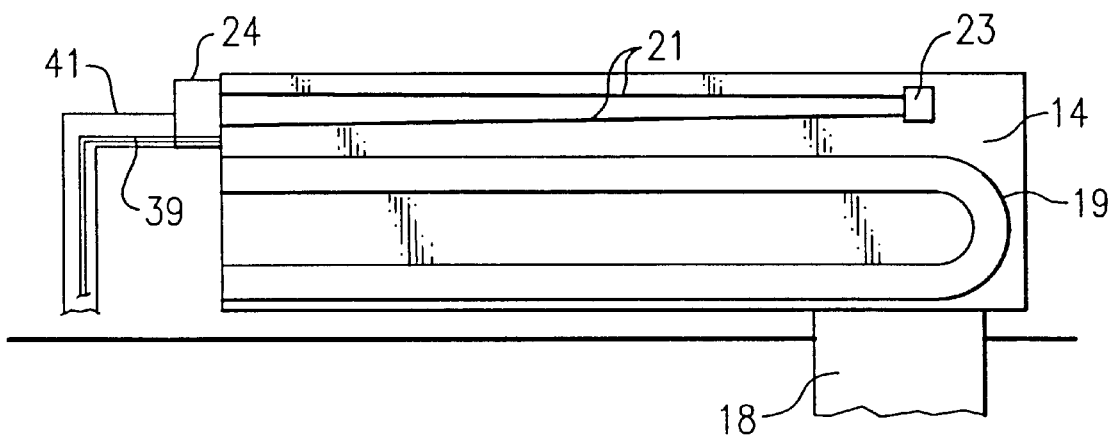
FIG. 6 is a schematic illustration of yet another embodiment of the invention.

Another embodiment of the invention is shown in FIG. 6 wherein, rather than passing through the heat exchanger compartment 14, a drain line 39 is caused to pass from the flue box 24 through the flue pipe 41, which is carrying the flue gases being discharged from the flue box. Although this space is not as hot as the heat exchanger compartment 14, it is maintained at temperatures well above freezing during operation of the furnace, and the temperatures would even be sufficient to melt condensate which might be trapped within the drain line 39 and freeze there during furnace-off conditions.

It will thus be seen that in all the embodiment of the present invention, the heat of combustion is applied to a condensate drain line, for the purpose of preventing the freezing of the condensate during furnace operation and for thawing any condensate that may be trapped and frozen in the drain line during periods when the furnace is turned off.

What is claimed is:

1. An improved condensing furnace of the type having a burner, a primary heat exchanger, a condensing heat exchanger and a blower for causing air to flow from a return air duct to the primary and condensing heat exchangers to be heated thereby and then to supply air duct comprising: a drain line connected to an outlet of said condensing heat exchanger for conducting the flow of condensate to a discharge site wherein said drain line passes through a space that is maintained by the furnace heat of combustion at temperatures above freezing during heating operation and further wherein said drain line also passes through said supply air duct.

2. A furnace as set forth in claim 1 wherein said temperature is maintained substantially above freezing such that any trapped condensate that may freeze during periods when the heating operation is off will be caused to thaw when the heating operation is resumed.

3. A furnace as set forth in claim 1 wherein said drain line passes through a space containing said primary heat exchanger.

4. A furnace as set forth in claim 1 wherein said drain line extends to a condensate trap located inside a building.

5. A furnace as set forth in claim 1 and including a drain pan located in a compartment containing said primary heat exchanger and further wherein said drain line conducts the flow of condensate to said drain pan.

6. A furnace as set forth in claim 5 wherein said drain pan is in direct contact with said primary heat exchanger such that the heat from said heat exchanger causes said condensate to vaporize.

7. An improved condensing furnace of the type having a burner, a primary heat exchanger, a condensing heat exchanger and a blower for causing air to flow over the primary and condensing heat exchangers to be heated thereby, comprising: a drain line connected to an outlet of said condensing heat exchanger for conducting the flow of condensate to a discharge site;

wherein said drain line passes through a space that is maintained by the furnace heat of combustion at temperatures above freezing during heating operation and further wherein said drain line passes through a flue pipe.

8. A furnace as set forth in claim 1 wherein said drain line extends to a trap located within said space.

9. A method of draining condensate from a condensing furnace located outdoors and having a burner, a primary heat exchanger, a condensing heat exchanger and a fan for causing air to flow from a return air duct to the primary and condensing heat exchangers to be heated and then to a supply air duct, comprising the steps of:

providing a drain line for conducting condensate from said condensing heat exchanger to a discharge, routing said drain line through a space designed to be maintained by the furnace heat of combustion at a temperature above freezing during heating operation and routing said drain line through said supply air duct.

10. A method as set forth in claim 9 wherein said drain line extends to a trap located within said space.

11. A method as set forth in claim 9 including the step of maintaining said space at a temperature substantially above freezing such that any trapped condensate that may freeze during periods when the heating operation is off will be caused to thaw when the heating operation is resumed.

12. A method as set forth in claim 11 wherein said drain line is routed through a compartment containing said primary heat exchanger.

13. A method as set forth in claim 9 wherein said drain line extends to a condensate trap located inside a building.

14. A method of draining condensate from a condensing furnace located outdoors and having a burner, a primary heat exchanger, a condensing heat exchanger and a fan for causing air to flow from a supply air duct to the primary and condensing heat exchangers to be heated, comprising the steps of:

providing a drain line for conducting condensate from said condensing heat exchanger to a discharge site and routing said drain line through a space designed to be maintained by the furnace heat of combustion at a temperature above freezing during heating operation and including the steps of providing a drain pan in a compartment containing said primary heat exchanger and conducting the flow condensate to said drain pan, and placing said drain pan in direct contact with said primary heat exchanger such that the heat from said heat exchanger causes said condensate to vaporize.

15. A method of draining condensate from a condensing furnace located outdoors and having a burner, a primary heat exchanger, a condensing heat exchanger and a fan for causing air to flow from a supply air duct to the primary and condensing heat exchangers to be heated, comprising the steps of:

providing a drain line for conducting condensate from said condensing heat exchanger to a discharge site and routing said drain line through a space designed to be maintained by the furnace heat of combustion at a temperature above freezing during heating operation;

wherein said drain line is routed through a flue pipe.

* * * * *